United States Patent [19]

Kubo

[11] Patent Number: 4,685,187
[45] Date of Patent: Aug. 11, 1987

[54] METHOD OF LOADING MAGNETIC RECORDING TAPE IN CASSETTE CASES

[75] Inventor: Toyohide Kubo, Tokushima, Japan

[73] Assignee: AWA Engineering Co., Ltd., Tokushima-ken, Japan

[21] Appl. No.: 886,661

[22] Filed: Jul. 16, 1986

[30] Foreign Application Priority Data

Jul. 22, 1985 [JP] Japan ................ 60-162606

[51] Int. Cl.⁴ ............................................. B23P 11/00
[52] U.S. Cl. ...................................... 29/434; 29/430
[58] Field of Search ............ 29/428, 429, 430, 434, 29/469; 206/387, 455; 360/134, 83, 90

[56] References Cited

U.S. PATENT DOCUMENTS 4,127,925 12/1978 Gaiser et al. .................. 29/430
4,330,925 5/1982 Kato et al. .................. 29/430 X

FOREIGN PATENT DOCUMENTS

19591 5/1985 Japan .

Primary Examiner—Howard N. Goldberg
Assistant Examiner—Ronald S. Wallace
Attorney, Agent, or Firm—Wenderoth, Lind & Ponack

[57] ABSTRACT

This invention loads tape into cassettes which have a zigzag shaped tape track. Positioning pins, which are located apart from the cassette's guide pins, shape the tape to conform to the cassette's zigzag pattern. When the reels are lowered to the cassette for loading, the positioning pins load tape between the guide pins without striking or contacting the guide pins.

5 Claims, 7 Drawing Figures

METHOD OF LOADING MAGNETIC RECORDING TAPE IN CASSETTE CASES

BRIEF SUMMARY OF THE INVENTION

This invention relates primarily to methods of loading cassettes with pairs of reels on which magnetic video, audio, data, etc. recording tape (For the purposes of this patent specification, the term "magnetic recording tape" is interpreted in the broad sense that emcompasses not only tape that is coated with magnetic material, but also tape leader which is attached between the coated tape and the reel. In the following this broad definition will be referred to by the term "tape".) has been wound. In particular, this invention relates to methods of loading pairs of reels wound with tape into cassettes with zigzag shaped tape tracks formed by guide pins.

The degree of tracking stability of a cassette tape is a critical factor. Particularly, when compared with reel to reel systems (no cassette), stable tracking of tape which is loaded in a cassette is in demand. Further, there is a special demand for tape in which tracking speed unevenness, or wow and flutter is extremely small. To meet these demands, currently used video tape is installed in cassettes with a zigzag shaped tracking pattern.

However, this type of cassette requires that the tape wound on a pair of reels be formed into zigzag patterns at 2 locations, and then be loaded into the cassette. Loading the reels and tape into cassettes is difficult, and is done by hand. This hand processing has the following disadvantages: it is inefficient, foreign objects are liable to attach to the tape surface during processing, and tape cannot be loaded into cassettes without disturbing the windings.

The technology to overcome these disadvantages has been proposed, for example, in the automatic reel loading method and apparatus of Japan Public No. 19591/1985.

The apparatus proposed in this publication (Public No. 19591/1985) extracts a length of tape from a pair of reels with positioning pins which shape the tape to conform to the zigzag pattern of the cassette's tape track. This apparatus loads the reels and tape into a cassette while maintaining the zigzag pattern. The positioning pins of this apparatus are located directly over the cassette guide pins. In other words, a planar view of the positioning pins which extract tape from the reels, and a similar planar view of the cassette case base guide pins show the two pin sets in the same positions. When the tape together with the reels are loaded in cassettes, the positioning pins are aligned with the cassette guide pins. Specifically, the positioning pins are open ended tubes into which the cassette guide pins insert to load tape into the gaps between the guide pins.

During the process where the guide pins are inserted into the positioning pins of the above mentioned apparatus, the positioning pins cannot consistently be reliably mated with the guide pins. This results from the extreme narrowness of the gap, which is on the order of 1 mm., between pairs of guide pins that form the cassette's zigzag tape track. Furthermore, the guide pins are metal pipes which fit in struts that are formed as a unit with the cassette case. Some play is allowed between the metal pipes and the struts. Therefore, the metal pipe locations are not fixed with complete accuracy, and the guide pin gaps may be further narrowed by this factor. The positioning pins which mate with these closely spaced guide pins must be extremely thin, narrowly spaced, and capable of accurately mating with guide pins that may be slightly out of position.

The ends of the tubular positioning pins cannot have tapered openings to mechanically align accurately with guide pins which are slightly out of position because the positioning pin material is thin. For these reasons, the following shortcomings exist: it is difficult to reliably mate the positioning pins with the guide pins at high speeds; it is difficult to realize prolonged operation without malfunction; and it is difficult to increase the efficiency of the reel loading process.

This invention was developed with the purpose of overcoming the above shortcomings. The primary objective of this invention is to provide a method of loading magnetic recording tape into cassette cases, whereby pairs of reels wound with tape can be reliably loaded at high speeds without malfunction into cassettes with zigzag shaped tape tracks.

The above and further objects and novel features of the invention will more fully appear from the following detailed description when the same is read in connection with accompanying drawing. It is to be expressly understood, however, that the drawing is for purpose of illustration only and is not intended as a definition of the limits of the invention.

BRIEF DESCRIPTION OF THE DRAWINGS

FIG. 4 is a top view.

FIG. 6 is a side view, and

DETAILED DESCRIPTION

The following provides an illustrated description a practical example of the invention, "a method of loading magnetic recording tape in cassette cases".

Figure 2:
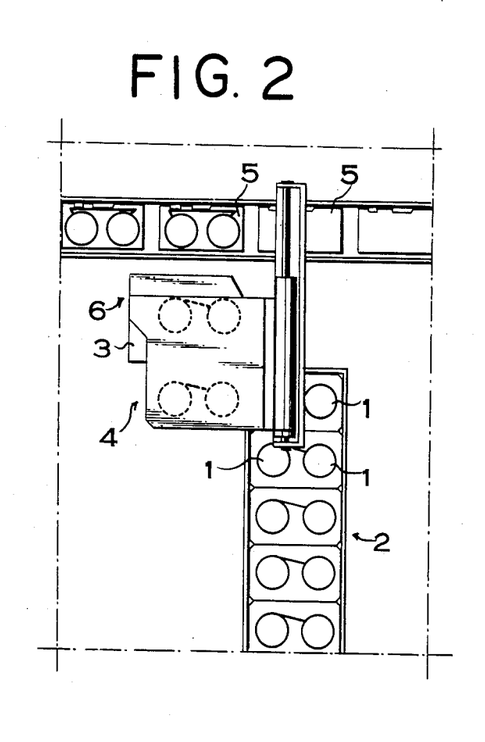
FIG. 2 is a top view depicting the process of loading reels wound with tape into cassettes.

As shown from above in FIG. 2, the required length of tape wound on a pair of reels 1 is delivered in trays by a conveyor system.

An intermediate transfer device 4, which grasps the reels 1 and delivers them to a loading stand 3, and a loading device 6, which loads pairs of reels 1 from the loading stand 3 into open cassette cases 5, are installed above the end of the conveyor 2.

The intermediate transfer device 4 and the loading device 6 move up and down together. The intermediate transfer device 4 moves pairs of reels from the conveyor 2 to the loading stand 3, and the loading device 6 moves pairs of reels from the loading stand 3 to cassette case bases.

Figure 3:
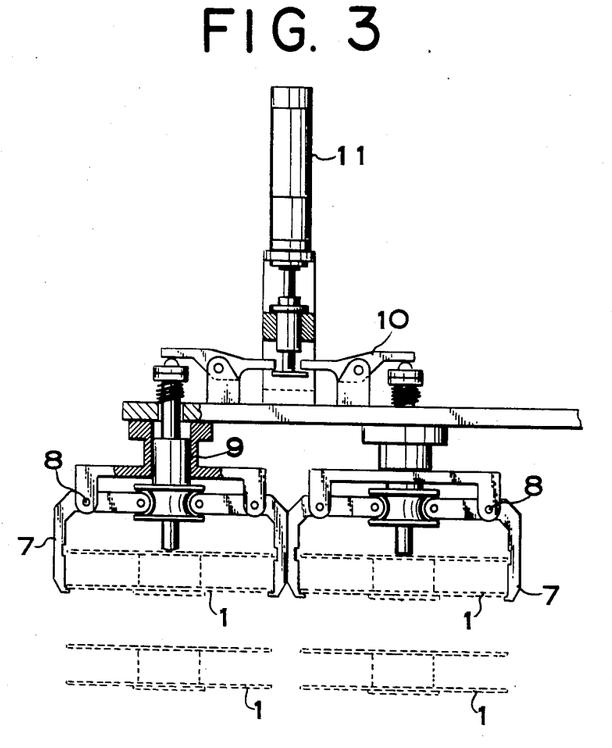
FIG. 3 is a cutaway view showing the reel gripping finger assemblies.

Any apparatus, which can transfer the reels 1 by retaining them from above, may be used for the intermediate transfer device 4 and the loading device 6. For example, as shown in FIG. 3, a device which grasps the outside edge of a reel with gripping fingers 7 can be used.

These gripping fingers 7 have an overall L shape, and are installed through bearings with pins 8. To grip a reel 1, the fingers are actuated by a cylinder 11 which acts through levers 10 and connecting rods 9 located at the center of the gripping finger 7 assemblies. Specifically, when a central connecting rod 9 is withdrawn upward by the cylinder 11, the tips of the gripping fingers 7 are squeezed together to grasp the outside edge of a reel 1.

A plurality of L shaped gripping fingers 7 are arranged at equal intervals in a radial configuration to grasp a reel's outer perimeter at 2 or more points, and preferably at 3 or more points.

Figure 4:
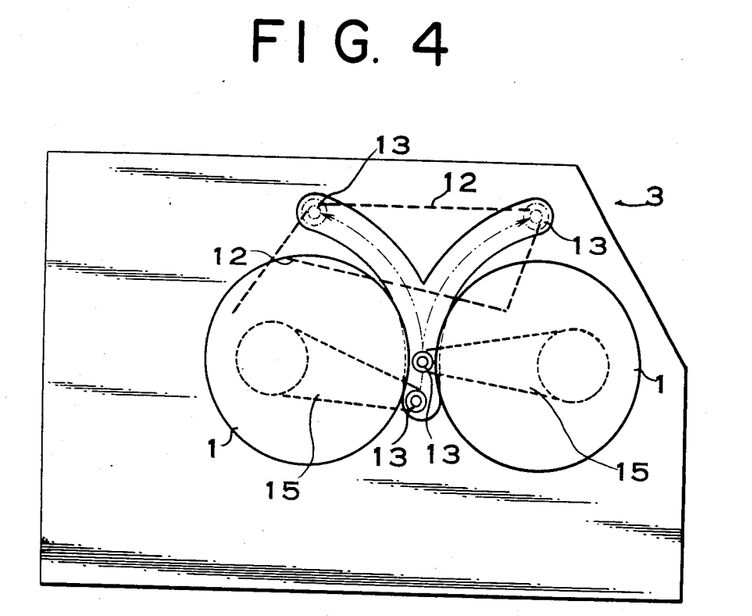
Figure 5:
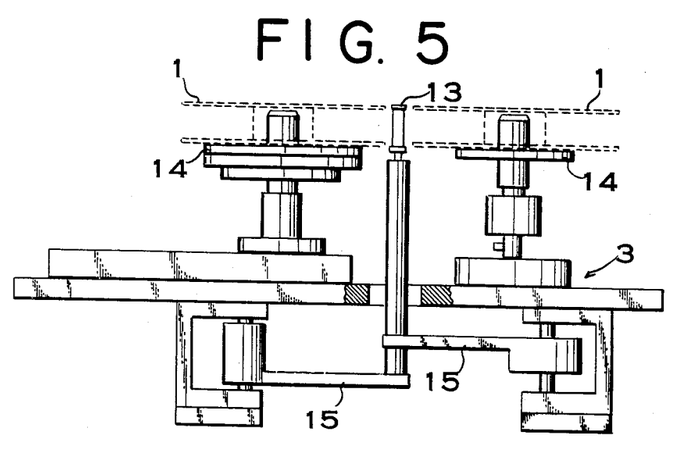
FIG. 5 is a front partial cutaway view of the loading stand.

As shown in FIG. 4, and FIG. 5, the loading stand 3 is equipped with tape extraction pins 13, which draw a small amount of tape 12 from each pair of reels 1 transferred off the conveyor.

The tape extraction pins 13 are positioned on the loading stand 3 in the same plane as the reel holders 14, and are attached perpendicular to the end of horizontal arms 15 such that they move in the horizontal plane to draw tape from the reels 1.

The horizontal arms 15 pivot on axes close to the central axes of the reels 1, and are moved about 75 degrees in the horizontal plane by actuating devices.

As shown by the broken line arrows of FIG. 4, the tape extraction pins 13 move tangentially from the reels 1 to withdraw tape 12. This permits positioning pins, which straddle the tape 12, to be introduced during the next processing step. The tape extraction pins 13 are moved in the horizontal plane, from a location between the center axes of a pair of reels 1, along an arc from the reel's outer perimeter, by movement of the horizontal arms 15, thus unwinding the tape 12.

The tape extraction pins 13 extend vertically up from the horizontal arms, which are located under the loading stand 3. With this arrangement, tape 12 can be unwound from the reels 1, which have been picked up and brought to the loading stand 3.

Reel pairs 1 on the loading stand 3, which have had some tape 12 withdrawn, are grasped from above by the loading device 6. The loading device 6 positions the tape to correspond to the zigzag track of the cassette case, and then loads the disks 1 into a cassette base 5. Accordingly, the loading device 6 is equipped with 4 positioning pins to position the tape so that it will correspond with the cassette case 5.

Figure 1:
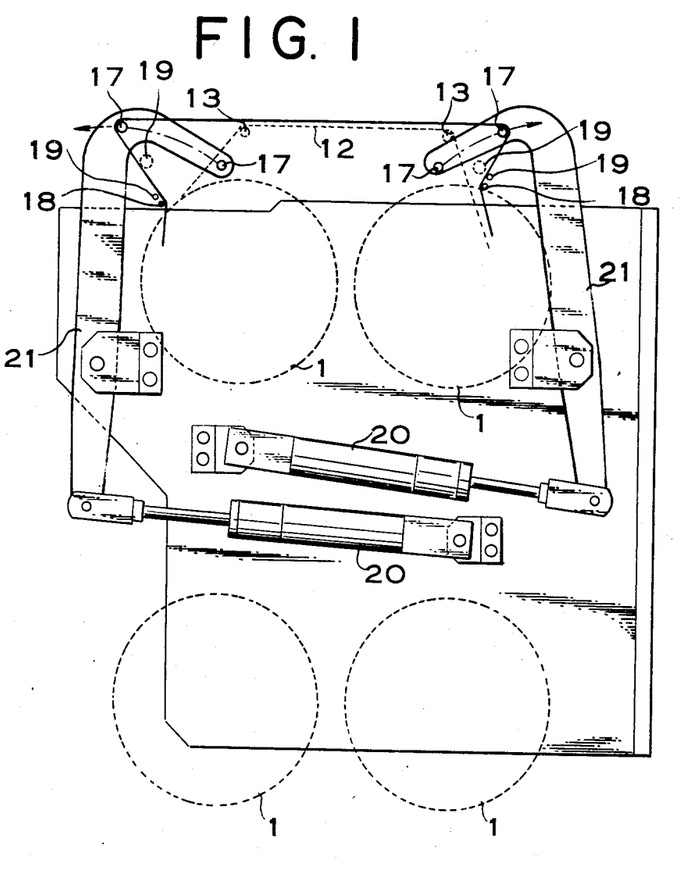
FIG. 1 is a top view of the cassette loading device used for this invention.
Figure 6:
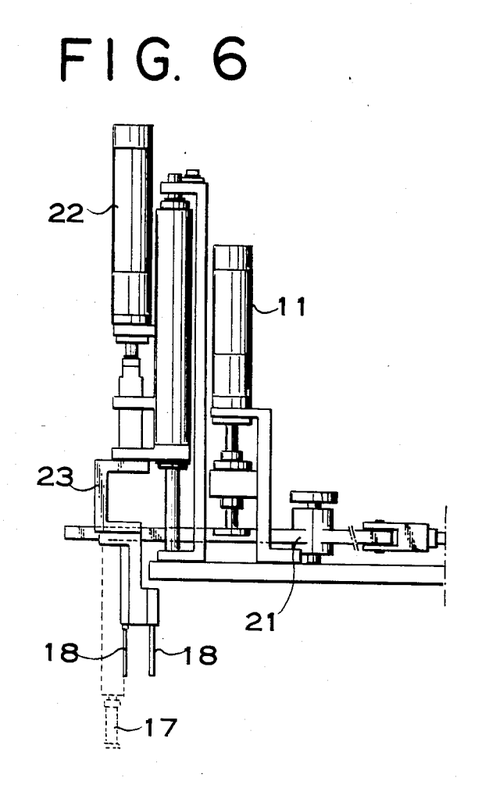
Figure 7:
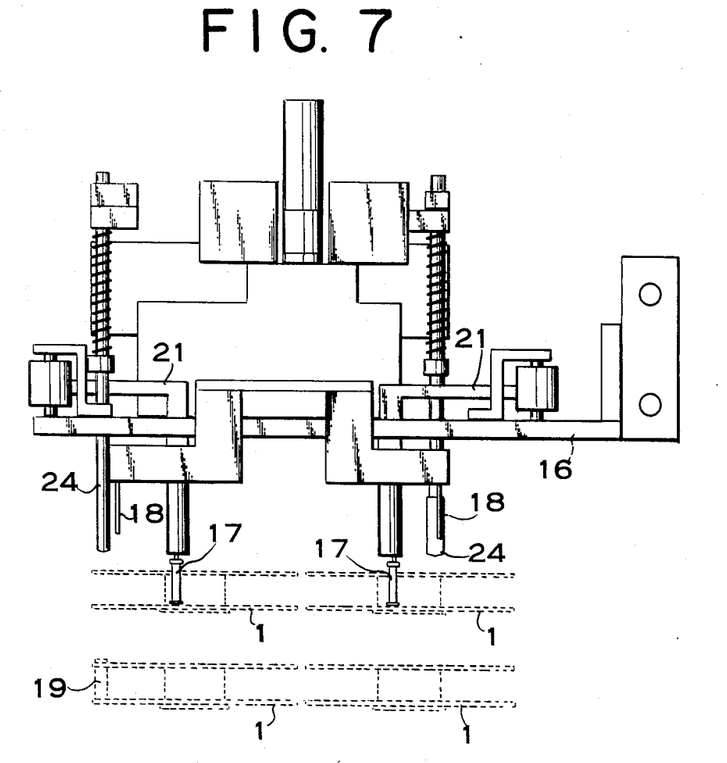
FIG. 7 is a front view of the loading device.

The positioning pins are perpendicular to, and extend downward from the base 16 of the loading device 6, as shown in FIG. 6 and FIG. 7. This allows the positioning pins to be inserted within the extracted tape of a reel pair 1 on the loading stand 3. As shown in FIG. 1, these positioning pins are comprised of 2 movable (positioning) pins 17, which further unwind tape 12 previously drawn from the reels 1 by the tape extracting pins 13, and 2 nearby fixed (positioning) pins 18.

The fixed pins 18 are located such that they insert outside of the tape 12 unwound by the tape extraction pins 13, while the movable pins 17 insert inside of the unwound tape 12. Tape 12 is drawn and shaped with zigzags at each reel 1 by the movable pins 17, which move in the horizontal plane in a direction that extracts tape (indicated by broken line arrows in FIG. 1). The tape is thus drawn and positioned such that it will insert between the cassette guide pins 19.

The movable pins 17 are perpendicular to, and extend downward from the end of actuating arms 21, which are rotated through the required angles in the horizontal plane by cylinders 20. The actuating arms 21 have an overall L shape, are attached at pivot points to both sides of the base 16 above the reels 1, and are connected to the cylinders 20 at the ends opposite the pins.

The movable pins 17 and the fixed pins 18 are offset from a position directly over the cassette guide pins 19, so that they will not hit the guide pins when the reel 1 is loaded into the cassette base 5.

The loading device base 16 is lowered towards the reels 1 on the loading stand 3 to allow the gripping finger assemblies 7 to grasp the reels 1. If the movable pins 17 and the fixed pins 18 are lowered together with the gripping assemblies, these pins can simultaneously be inserted within the reel's extracted tape.

However, as shown in FIG. 6, attachment of the fixed pins 18 to a vertically moving frame 23, which is actuated by a cylinder 22, is a also possible. In this case, the fixed pins are lowered to; and inserted outside of the extracted tape 12 after the gripping finger assemblies 7 and the movable pins 17 have been lowered to the reels on the loading stand 3.

Once the loading device has grasped the reels 1, the positioning pins have shaped the tape to correspond to the zigzag pattern of the cassette case 5, and the reels are lowered to an open cassette base 5, it is desirable to hold the cassette guide pins 19 in a fixed position. As shown in FIG. 7, this is realized with alignment pins 24 which project from the underside of the loading device base 16 directly over the cassette case guide pins 19.

When the loading device base 16 is lowered toward a cassette case, it is necessary to press down on, and hold the guide pins 19 with the alignment pins 24 prior to inserting the tape between the guide pins 19. Therefore, the alignment pins 24 are installed on the loading device base 16 through a cylinder and spring, etc. which make up a pushrod assembly. When the loading device base is lowered, the alignment pins 24 press on the top of the guide pins 19 to hold them in place before the tape is introduced past the guide pins 19.

The alignment pins 24 are tapered to a point to align with the top of the tubular guide pins 19, and hold those pins in position simply by pressure application. Specifically, the tapered points of the alignment pins 24 mechanically center in the tubular guide pins 19, thus aligning the guide pins 19, and holding them in a fixed position.

After the loading device 6 has loaded a pair of reels 1 from the loading stand into a cassette case base 5, the loaded cassette base is transferred to the next processing step, and the cassette case top is attached.

The reel loading process is as follow;

(1) Reel pairs 1, which have been delivered by the conveyor 2, are grasped from above, and transferred to the loading stand 3 by the intermediate transfer device 4.

(2) While the reel pair is on the loading stand 3, a length of tape is unwound from the reels 1 by the tape extraction pins 13.

(3) The reel pair 1 on the loading stand 3 is grasped from above by the loading device 6, the tape is held by the movable (17) and fixed (18) positioning pins in a shape that can be loaded from the loading stand 3 into a cassette base 5.

(4) The loaded cassette containing a reel pair 1 is conveyed to the next step where further required processing, such as attaching the top of the cassette, is perormed.

Incidentally, the intermediate transfer device 4 and the loading device 6 are integrated to move vertically and horizontally as a single unit. While the intermediate transfer device fetches reel pairs 1 from the conveyor 2 and transfers them to the loading stand 3, the loading device 6 simultaneously loads reel pairs 1 from the loading stand 3 into cassette cases 5.

For the purposes of this patent specification, the phraseology "the reels are lowered to an open cassette base" means that the reels are lowered relative to the cassette case. This phraseology is used in the broad sense that includes holding the reels stationary while raising a cassette case. Operation and effect are as follow.

Pairs of reels, previously wound with the required length of tape, are delivered to the cassette loading area on trays, etc. The tape on these reel pairs is taken up on one reel such that it leaves the hub tangentially and connects to the opposite reel with the shortest possible distance. When reel pairs wound with tape in this fashion are held from above and loaded into opened cassette case bases, it is necessary to position the tape to conform with the tape track of the cassette case base. In other words, the tape and reels are held and loaded such that the tape will load into the tape track of the cassette case base.

This invention loads tape wound on reel pairs, with minimum tape length between reels, into cassette case bases by holding the tape with positioning pins in a configuration that will load into the cassette case base's zigzag shaped tape track. When the reels and tape are lowered toward the cassette, the positioning pins guide the tape into the cassette's zigzag shaped tape track. However, the positioning pins are displaced from directly over the cassette guide pins so that they do not touch the guide pins. From these displaced positions, the positioning pins guide the tape between the guide pins into the cassette's zigzag shaped tape track.

Explaining this process based on FIG. 1, the positioning pins hold the tape in the configuration shown by the solid line. This tape configuration is maintained while the reels and tape are lowered to the cassette case base. The positioning pins guide the tape between the cassette's guide pins as the reel pair is loaded into the cassette.

With this arrangement for guiding tape into the cassette's zigzag shaped tape track, there is no need to mate tubular metal, etc. positioning pins with the closely spaced cassette guide pins. Since the positioning pins are inserted around (straddling) the guide pins, the loading operation is not stopped by positioning pins striking guide pins. Further, since only extremely thin tape is introduced between the guide pins, regardless of how closely the guide pins are spaced, as long as there is a gap, tape can be smoothly and reliably loaded between the guide pins.

Furthermore, since there is no necessity to insert the guide pins into any tubes in order to guide the tape into the zigzag shaped tape track, the top of the guide pins may be pressed on and held by an alignment pin with a tapered point, while the tape is loaded. With this arrangement, misalignment caused by play in the guide pins is avoided, and the tape is more reliably introduced between the guide pins.

What is claimed is:

1. A method of loading pairs of reels wound with magnetic recording tape into opened cassette case bases having a zigzag shaped tape track formed by guide pins, which comprises:
   (a) holding the reel pairs from above;
   (b) positioning tape wound on the reels to conform with the cassette's said zigzag shaped tape track by means of a plurality of positioning pins;
   (c) maintaining the tape in the zigzag shape while lowering the reels and tape to the cassette case base;
   (d) loading the reels and tape into the said cassette case base;
   (e) locating said positioning pins such that they do not strike or contact the cassette case guide pins when they are lowered to said cassette case base;
   (f) shaping, by means of said positioning pins, the tape wound on a reel pair to correspond to the cassette's said zigzag shaped tape track formed by cassette case guide pin gaps; and
   (g) maintaining the tape in the zigzag configuration while the tape and reel pair are lowered to, and loaded into said cassette case base.

2. A method of loading magnetic recording tape in cassette cases as claimed in claim 1 in which positioning pins comprising fixed pins and movable pins shape the tape wound on a pair of reels to correspond to the guide pin gaps in said cassette case base.

3. A method of loading magnetic recording tape in cassette cases as claimed in claim 1 in which said cassette case guide pins are pressed and held from above while the tape and reels are lowered to said cassette case base.

4. A method of loading magnetic recording tape in cassette cases as claimed in claim 1 in which each reel is grasped and held at the reel perimeter.

5. A method of loading magnetic recording tape in cassette cases as claimed in claim 1 in which tape is shaped by said positioning pins to correspond to cassette's said zigzag shaped track, after that tape has been unwound from said reel pair by tape extraction pins.

* * * * *